(12) United States Patent
Morando

(10) Patent No.: US 7,618,666 B2
(45) Date of Patent: Nov. 17, 2009

(54) EDIBLE CANDY CONFECTION WITH IMPROVED SHELF-LIFE AND METHOD OF MAKING THEREOF

(76) Inventor: E. Donald Morando, 40 Canterbury La., East Greenwich, RI (US) 02818

( * ) Notice: Subject to any disclaimer, the term of this patent is extended or adjusted under 35 U.S.C. 154(b) by 78 days.

(21) Appl. No.: 11/733,888

(22) Filed: Apr. 11, 2007

(65) Prior Publication Data

US 2007/0178200 A1     Aug. 2, 2007

Related U.S. Application Data

(63) Continuation-in-part of application No. 11/084,902, filed on Mar. 21, 2005, now abandoned.

(60) Provisional application No. 60/571,700, filed on May 17, 2004.

(51) Int. Cl.
    *A23P 1/08*     (2006.01)
    *A23G 1/00*     (2006.01)

(52) U.S. Cl. .................. 426/306; 426/303; 426/660; 426/100; 426/102; 426/93

(58) Field of Classification Search .................. 426/306
    See application file for complete search history.

(56) References Cited

U.S. PATENT DOCUMENTS

| | | | |
|---|---|---|---|
| 1,715,831 A * | 6/1929 | Hahnemann | ................ 181/160 |
| 2,182,784 A | 12/1939 | Bayer | |
| 2,198,726 A * | 4/1940 | Shwom et al. | ............... 426/306 |
| 2,651,575 A | 9/1953 | Talburt et al. | |
| 2,682,471 A | 6/1954 | Alther | |
| 3,574,639 A * | 4/1971 | Forkner | ........................ 426/99 |
| 4,021,583 A | 5/1977 | Arden | |
| 4,150,163 A * | 4/1979 | Peterson | ...................... 426/660 |
| 4,353,927 A | 10/1982 | Lovercheck | |
| 4,563,363 A * | 1/1986 | Yoon | ........................... 426/303 |
| 4,822,627 A | 4/1989 | Clegg et al. | |
| 4,888,187 A * | 12/1989 | Given et al. | ................. 426/102 |
| 4,963,379 A * | 10/1990 | Ferrero | ........................ 426/306 |
| 5,085,877 A | 2/1992 | Youcheff et al. | |
| 5,256,426 A | 10/1993 | Tomioka et al. | |
| 6,001,404 A | 12/1999 | Mochizuki | |
| 6,071,546 A | 6/2000 | Nalur | |
| 6,200,125 B1 | 3/2001 | Akutagawa | |
| 6,200,612 B1 * | 3/2001 | Spector | ...................... 426/102 |
| 6,231,899 B1 * | 5/2001 | Rosso | ......................... 426/94 |
| 6,242,028 B1 | 6/2001 | Bean | |
| 6,261,620 B1 | 7/2001 | Leadbeater | |
| 6,379,724 B1 | 4/2002 | Best et al. | |
| 6,406,733 B1 | 6/2002 | Willcocks et al. | |
| 6,524,635 B1 * | 2/2003 | Aebi | .......................... 426/103 |
| 7,232,584 B2 * | 6/2007 | Rabinovitch et al. | ......... 426/306 |
| 2005/0072321 A1 | 4/2005 | Larsen | |

FOREIGN PATENT DOCUMENTS

| | | |
|---|---|---|
| DE | 1767537 B | 1/1978 |
| EP | 0408374 A2 | 1/1991 |
| GB | 2075326 A | 11/1981 |
| JP | 72014893 B | 5/1972 |

OTHER PUBLICATIONS

Teubner, C. 1997. The Chocolate Bible. Penguin Studio. London, England., p. 54-59.*
Frazier, W. C., "Food Microbiology", McGraw-Hill, Inc., 2nd Ed, 1967, pp. 5-7, 40, 195-197, 1999.
Jay, J. M., "Modern Food Microbiology", D. Van Nostrand Co., 1970, pp. 30-32, 113-114.
"Solubility", source(s): httpt//chemed.chem.purdue.edu/genchem/topicreview/bp/ch18/soluble.html.

* cited by examiner

*Primary Examiner*—Carolyn A Paden
(74) *Attorney, Agent, or Firm*—Barlow, Josephs & Holmes, Ltd.

(57) ABSTRACT

An edible candy confection and a method of making the confection is disclosed. The method includes the steps of freezing fresh fruit, coating the frozen fruit with sugar solids sufficient to reach a critical mass, keeping the fruit frozen during the coating process, depositing a wafer, placing the coated fruit on the wafer, and sealing the coated fruit and wafer in a confection layer such as chocolate. The wafer may be formed from chocolate or yogurt. Optimally, the critical mass if the coated frozen fruit is at least 67 Brix with water activity of at least 0.60.

20 Claims, 4 Drawing Sheets

EDIBLE CANDY CONFECTION WITH IMPROVED SHELF-LIFE AND METHOD OF MAKING THEREOF

CROSS-REFERENCE TO RELATED APPLICATION

This application is a continuation in part of U.S. patent application Ser. No. 11/084,902, filed Mar. 21, 2005, now abandoned, which claims priority to earlier filed U.S. Provisional Application Ser. No. 60/571,700, filed May 17, 2004, the contents of which are incorporated herein by reference.

BACKGROUND OF THE INVENTION

1. Field of the Invention

The present invention relates generally to an edible candy confection with improved shelf-life and more particularly to a method of making a confection that uses fresh fruit as an ingredient with improved shelf-life.

2. Background of the Related Art

Confectioners have always desired to use fresh fruit in the confections that they create. Fresh fruit, however, has a short shelf life making it generally unsuitable for mass production. Typically, fruit will only last a couple of days before becoming inedible due to decay, fermentation and mold. Therefore, there is a need for a method to improve the shelf life of confections using fresh fruit as an ingredient.

Use of artificial preservatives has been one solution that confectioners have used in the past to overcome the problem of the short shelf life of the fruit. However, the process of preparing fruit for preservation involves destroying the natural flavoring of the fruit; the most desirable characteristic of the fruit. This problem has been overcome by using artificial flavoring to reconstitute the flavor lost in the preservation process. Additionally, in our health and environmentally conscious society, it has become unacceptable to some people to ingest foods containing artificial preservatives and artificial flavorings as ingredients. Therefore, there is a need for a method to preserve the fruit for use in a confection without artificial preservatives and artificial flavorings and a method to preserve a fruit in a confection without harming the naturally flavoring of the fruit.

In addition, confections made with fruit often have liquid in the center, such as syrup. If the confection is not sealed, the syrup can leak out of the confection creating a mess and allowing mold and bacteria to grow inside the confection. In particular, the bottom surface of the confection has been found to be the weak point in the confection and is prone to being puncture or ruptured. Therefore, there is a need for a method of making a confection that resists damage to prevent leaks and growth of bacteria and/or mold.

SUMMARY OF THE INVENTION

The present invention solves the problems of the prior art by providing a unique process for making a confection with fresh fruit with an improved shelf life without the use of artificial preservatives and flavorings, and that retains the natural flavoring of the fruit. Moreover, the confection of the present invention includes a unique reinforced bottom surface that resists leaks to further maintain the appearance and prolong the shelf-life of the confection.

An object of the present invention is the provision for a method of making a fresh fruit confection that has an improved shelf life.

Another object of the present invention is the provision for a method of making a fresh fruit confection that has a shelf life of at least six months.

Yet, another object of the present invention is the provision for a method of making a fresh fruit confection that does not require artificial preservatives to maintain its freshness.

Yet, another object of the present invention is the provision for a method of making a fresh fruit confection with an improved shelf life without damaging the natural flavor of the fresh fruit ingredients.

Yet, another object of the present invention is the provision for a method of making a fresh fruit confection that does not require artificial flavorings.

Another object of the present invention is the provision for a method of making a confection that does not leak liquids contained in the center of the confection.

BRIEF DESCRIPTION OF THE DRAWINGS

These and other features, aspects, and advantages of the present invention will become better understood with reference to the following description, appended claims, and accompanying drawings where:

DESCRIPTION OF THE PREFERRED EMBODIMENT

Figure 1:
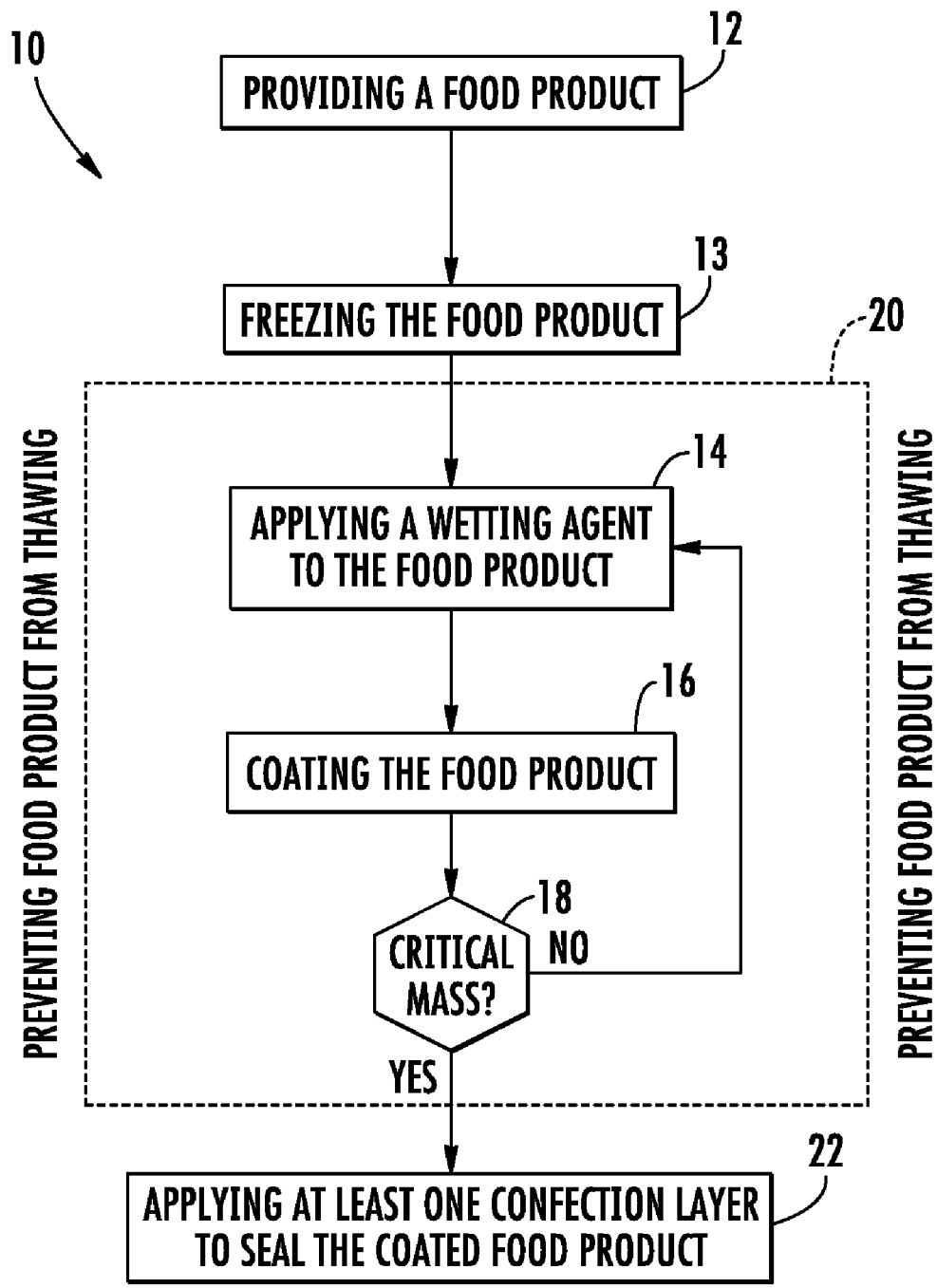
FIG. 1 is a flow chart of an embodiment of the method of the present invention.

Referring now to FIG. 1, a flow chart of the steps of the method of the present invention is shown generally at 10.

In the first step, fresh food product is obtained 12. The food product can be any whole or diced fruit such as pineapples, strawberries, peaches, blueberries, blackberries, raspberries, and cherries. The food product is then frozen 13. The method of freezing the fresh fruit is preferably by well known industry methods of freezing fresh fruit such as the individually quick frozen (IQF) method, but may be by any other freezing method well known in the art. The critical aspect to the present invention is that the fresh fruit must be frozen. Selection of the best method of freezing particular varieties of fresh fruit to preserve optimal freshness, taste, and other desirable characteristics of the fruit are well known in the art.

A wetting agent is then applied 14 to the food product. Preferably, the wetting agent is a simple solution of sugar and water in a 50/50 ratio, but ratio of sugar to water is not critical and the solution may include other ingredients such as flavor enhancers or other natural flavorings. The wetting agent may also contain citric acid for flavor enhancing and as an aid in the control of yeast and mold growth. The solution may also include invertase, or an enzyme, to hydrolyze the sucrose. Converting sucrose to invert sugar, aids in obtaining and/or increasing the sugar solid value to at least 67 Brix. The type of sugar selected is preferably a fondant sugar such as Amerfond®, but other sugars of different coarseness or crystal size may be used. Moreover, if desired the sugar may be omitted completely and substituted with a sugar substitute or sugar free ingredient having high solubility. The wetting agent is applied to cover the individual frozen food product pieces evenly to ensure that the coating, described below, adheres to the frozen food product. Many methods are extremely well known in the art to apply a liquid to a solid, both manually and automatically, and any particular manner in applying the wetting agent to the food product is not critical to the present invention.

The food product is then coated 16 with sugar solids or if desirable, a sugar substitute having high solubility. The sugar solids are preferably a fondant sugar such as Amerfond®. For ease of description, sugar solids will be referred to throughout, but the scope of the subject matter is intended to include sugar substitutes and other sugar free ingredients as interchangeable substitutes for the sugar solids. The food product is coated with a sufficient amount of sugar solids until it reaches a critical mass. The critical mass of the food product is targeted for a sufficient weight wherein the concentration of sugar is at least 67 Brix (or an equivalent concentration of sugar substitute) and a water activity of at least 0.60. For instance, if blueberries are used according to the present invention 1 part blueberries would require approximately 2.5 parts sugar solids to reach the desired critical mass. For other fruits, like raspberries that have a higher moisture content, it may be necessary to increase the sugar application to at least a ratio of 3.0 or higher to accomplish a Brix of 67-72 or higher. If necessary, the wetting and coating steps are repeated 18 until the desired critical mass is achieved. The critical mass of the food product is a sufficient build up of sugar solids on the food product that will retard microbial and/or chemical deterioration of the food product. The sugar solids dissolve in the water naturally occurring in the food product as it thaws, thereby locking the water up and behaving as a natural preservative to the now thawed product.

Many methods are extremely well known in applying a granular or powdered substance to a solid, no particular method being critical to the present invention herein. By way of example and not of limitation, one such method would be using a revolving container. The food product is loaded into the container or pan and the sugar solids are added into the pan. The container generally revolves at a rate of 20 RPM, thereby gently agitating and mixing the contents together. Within the industry this process is commonly referred to as "panning."

During the wetting and coating of the food product, it is critical that the food product remain 20 frozen. If the food product thaws during the application or the coating steps, it will become an unusable mass. One method to keep the food product frozen is to add pellets of dry ice to the food product during the wetting and coating processes. Alternatively, spraying $CO_2$ or liquid $N_2$ onto the food product would also work equally well. Another alternative that would also work well would be to prepare the food product in a refrigerated room or a freezer environment substantially between 0 and 10 degrees Fahrenheit. Blowing super cold air roughly between 0 and 10 degrees Fahrenheit, would also work well. The method of keeping the food product frozen is not critical; the key to the process is that the food product must be kept firm or at a temperature between 0 and 20 degrees Fahrenheit is order for the food product to support itself during the process of adding the required amount of sugar solids to reach the critical mass.

Once the coated food product has reached the proper critical mass, the food product must be sealed 22 in a confection layer, such as chocolate or yogurt. Covering a confection in chocolate, or a similar out confection layer, is extremely well known in the art. The process basically consists of adding a bottom confection layer to the coated food product and then enrobing the coated food product in another confection layer. These steps are commonly referred to as "bottoming" and "enrobing" within the art. The resulting confection thus consists of the coated food product sealed within the confection layer. The bottoming and enrobing steps may be repeated as desired to decrease the likelihood of a leak in the confection layer.

Figure 2:
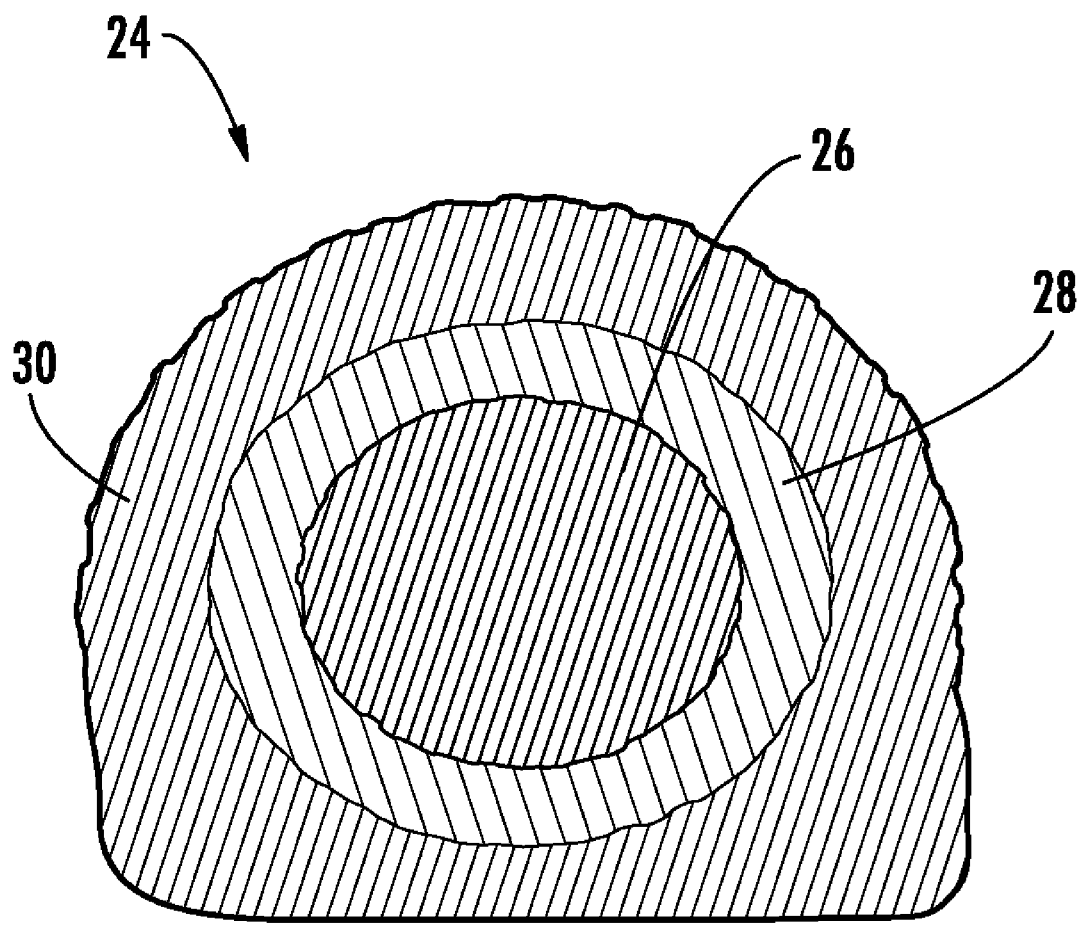
FIG. 2 is a cross-section of a confection made according to the embodiment of the method of the present invention shown in FIG. 1.

The finished confection, shown in FIG. 2 at 24, has a product center 26 covered in a sugar solid coating 28 (or sweetener coating) and bottomed and enrobed in a confection layer 30, such as chocolate. As mentioned previously, as the product thaws, the water naturally occurring in the product mixes with the sugar solid layer 28 surrounding the product center forming syrup that naturally preserves the product. Additionally, the confection layer 30 seals in the thawed product 26 and the syrup from the outside air to further prolong the shelf life of the confection.

The finished confection may then be packaged for display, storage and shipping using well known conventional methods or further processed to add adornments and other ingredients as desired.

Figure 3:
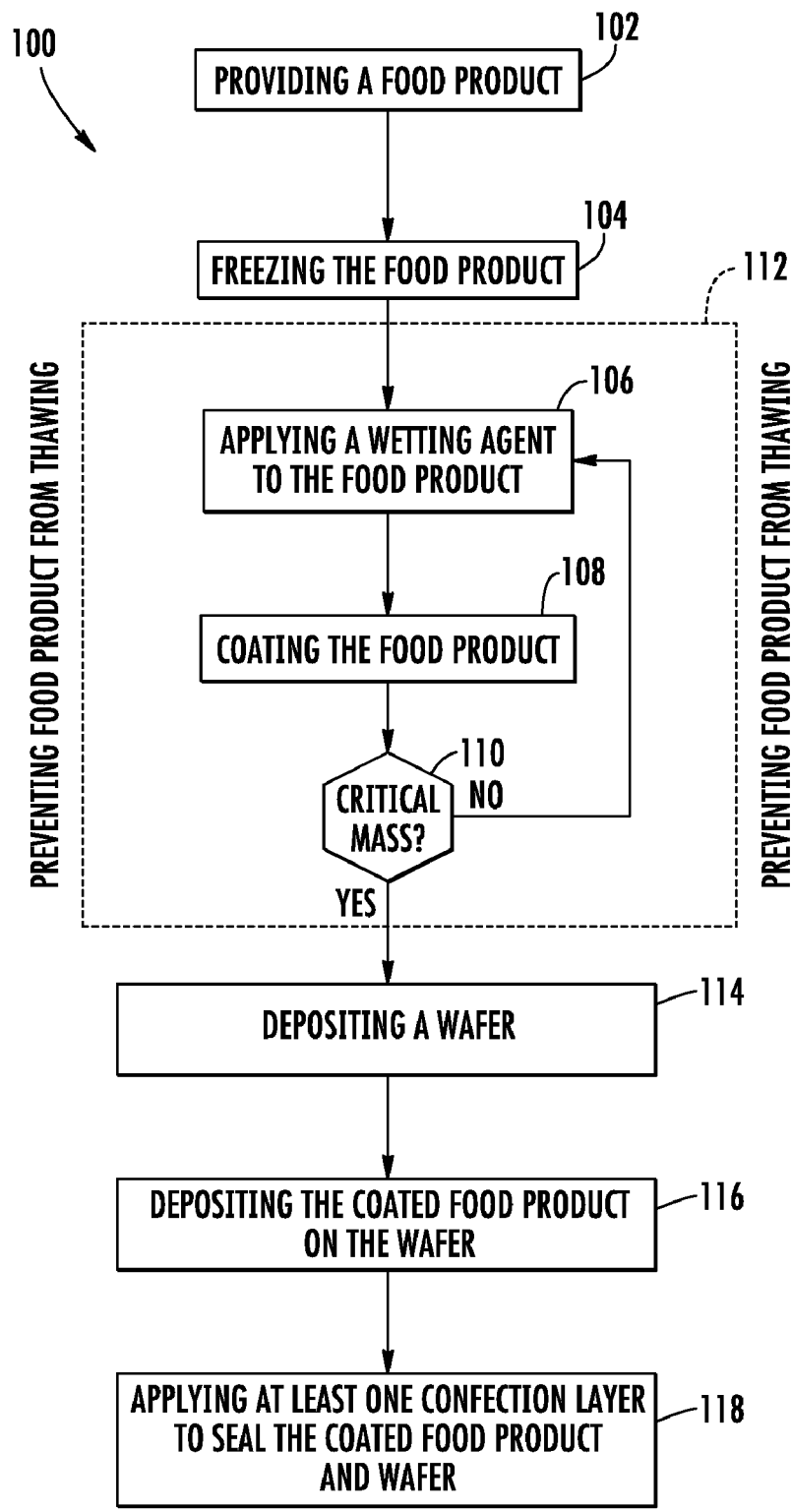
FIG. 3 is a flow chart of the preferred embodiment of the method of the present invention.

Referring to FIG. 3, an alternative embodiment of the method of the present invention is shown generally at 100. Like the previous embodiment 10, the alternative embodiment 100 includes the steps of obtaining a food product 102 such as fresh fruit, freezing the food product 104, then subsequently applying a wetting agent 106 to the food product in successive coats 108 until it reaches a critical mass 110. During the coating process, the food product is prevented from thawing 112. These steps are performed in the same manner described above previously for the first embodiment 10. However, after the frozen and coated food product has reached its critical mass 110, two additional intervening steps 114, 116 are taken to finish the confection prior to finally enrobing 118 the frozen and coated food product.

Next to form a wafer a warm mass is deposited 114 on a moving belt which is traveling over a cold plate. The mass begins to cool forming the wafer. The wafer may be formed of pure chocolate, yogurt or other edible material by using a depositor configured to deposit enough chocolate or yogurt to form the wafer. The frozen and coated food product is then placed 116 manually or automatically on the newly formed wafer whose center is still plastic, thereby locking the center onto the cooling wafer. Finally, the frozen and coated food product and fully solidified wafer are fully enrobed 118 in a chocolate or yogurt coating, thereby sealing the wafer and coated food product therein.

Figure 4:
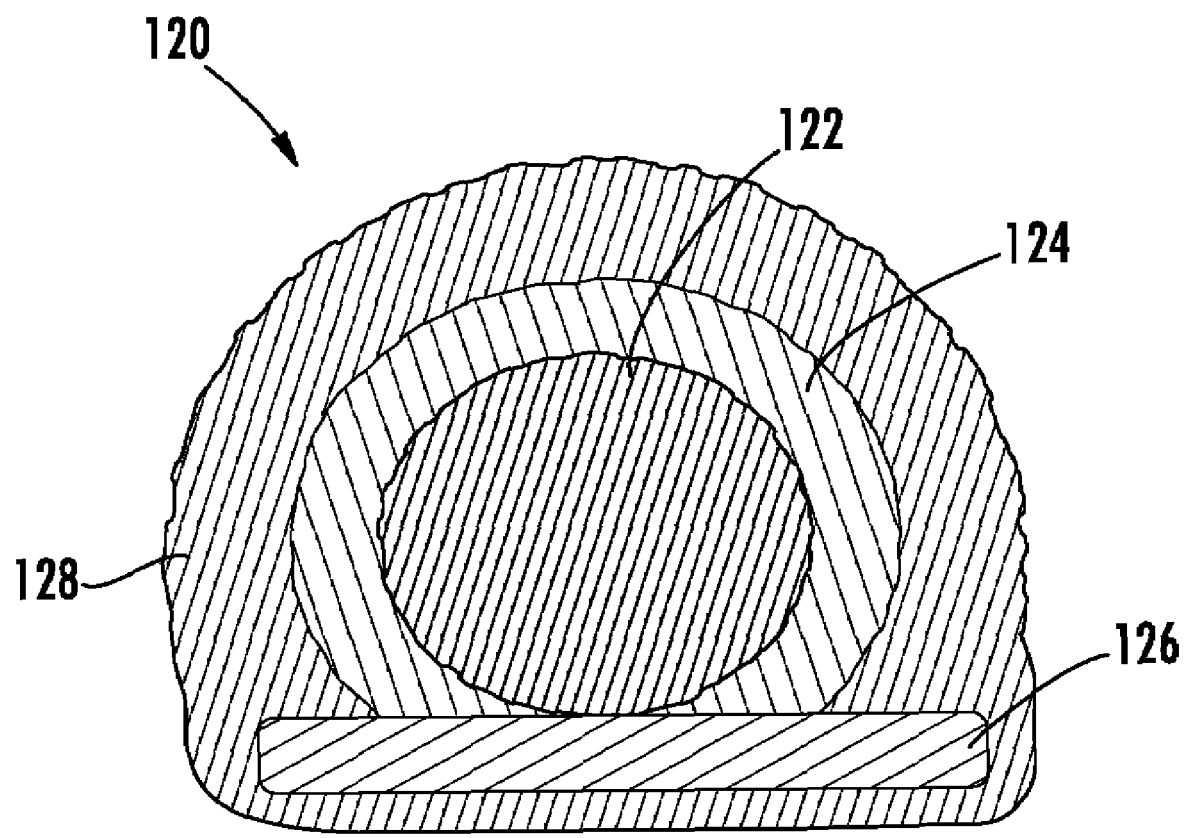
FIG. 4 is a cross-section of a confection made according to the preferred embodiment of the method of the present invention shown in FIG. 3.

The finished confection, shown in FIG. 4 at 120, has a product center 122 covered in a sugar solid coating 124 (or sweetener coating) resting on the wafer 126 and bottomed and enrobed in a confection layer 128, such as chocolate or yogurt. As mentioned previously, as the food product 122 thaws, the water naturally occurring in the food product 122 mixes with the sugar solid layer 124 surrounding the product center 122 thereby forming syrup that naturally preserves the product. Additionally, the confection layer 128 seals in the thawed product 122 and the syrup from the outside air to further prolong the shelf life of the confection. The wafer 1 26 reinforces the bottom surface of the confection 120, to prevent leaks of the syrup from center.

Often the bottom portion of a confection is a weak point in the outer confection layer 128. By placing the food product 122 on the wafer 126, the wafer 126 subsequently serves to reinforce the outer confection layer 128 to prevent punctures or ruptures allowing bacteria and mold to enter the center portion of the confection 120 or the soft or liquidous contents of the center of the confection to escape the confection 120.

One skilled in the art would appreciate that the use of a wafer may be used to reinforce the bottoms of many other types of confections that have liquid, semi-liquid or soft centers. For instance, confections that include marshmallow and cream centers could benefit from the method.

By use of the method of the present invention, extended shelf life of at least six months and upwards of one year or more is attainable. Therefore, it can be seen that the present invention provides a new and unique method of creating a confection with fresh fruit that has an improved shelf life.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

I claim:

1. A method of making an edible candy confection, comprising:
   providing a food product having an outer surface;
   forming a non-baked wafer from a molten mass of an edible confection;
   placing the food product on the wafer; and
   applying at least one confection layer to seal the food product and wafer therein;
   whereby the wafer serves to reinforce the confection layer on a bottom surface of the confection.

2. The method of claim 1, further comprising the steps of:
   freezing the food product;
   coating the outer surface of the food product with a sweetener coating until the food product reaches a critical mass resulting in a coated food product;
   preventing the food product from thawing during the coating of the food product.

3. The method of claim 2, further comprising applying a wetting agent to the food product prior to coating the food product.

4. The method of claim 3, wherein the wetting agent comprises a solution of water and sugar.

5. The method of claim 2, wherein the sweetener coating is sugar solids.

6. The method of claim 2, wherein the coated food product has a concentration of sweetener of at least 67 Brix.

7. The method of claim 2, wherein the coated food product has a water activity of at least 0.60.

8. The method of claim 1, wherein the food product is fresh fruit.

9. The method of claim 1, wherein the confection layer is selected from the group comprising chocolate and yogurt.

10. The method of claim 1, wherein the wafer is selected from the group comprising chocolate and yogurt.

11. The method of claim 1, wherein the wafer is formed by a depositor.

12. The method of claim 1, wherein the step of placing the food product on the wafer is performed while the wafer is still soft and not fully set.

13. A method of making an edible candy confection, comprising:
   providing frozen fruit;
   applying a wetting agent comprising a solution of water and sugar to the frozen fruit;
   coating the frozen fruit with sugar solids;
   repeating the application of the wetting agent and the coating of the frozen fruit until the frozen fruit reaches a critical mass resulting in coated frozen fruit whereby the coated frozen fruit has a concentration of sugar of at least 67 Brix and water activity of at least 0.60;
   preventing the frozen fruit from thawing during the application of the wetting agent and the coating of the frozen fruit;
   depositing a wafer of a molten mass of an edible confection;
   placing the coated food product on the wafer while the wafer is still soft and pliable and not fully set; and
   applying at least one confection layer to seal the coated frozen fruit and wafer therein;
   whereby the wafer serves to reinforce the confection layer on a bottom surface of the confection.

14. The method of claim 13, wherein the confection layer is selected from the group comprising chocolate and yogurt.

15. The method of claim 13, wherein the wafer is selected from the group comprising chocolate and yogurt.

16. An edible candy confection, comprising:
   a non-baked wafer;
   a food product resting on the wafer; and
   an outer coating enrobing and sealing the wafer and food product therein;
   whereby the wafer serves to reinforce the outer coating on a bottom surface of the confection.

17. The confection of claim 16, wherein the food product further comprises syrup, the syrup being contained within the outer coating.

18. The confection of claim 16, wherein the wafer is selected from the group comprising chocolate and yogurt.

19. The confection of claim 16, wherein the outer coating is selected from the group comprising chocolate and yogurt.

20. The confection of claim 16, wherein the food product is selected from the group comprising fresh fruit, marshmallow, and cream.

\* \* \* \* \*